United States Patent
Epstein

(10) Patent No.: US 6,601,046 B1
(45) Date of Patent: Jul. 29, 2003

(54) USAGE DEPENDENT TICKET TO PROTECT COPY-PROTECTED MATERIAL

(75) Inventor: Michael A. Epstein, Spring Valley, NY (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/454,350

(22) Filed: Dec. 3, 1999

Related U.S. Application Data

(60) Provisional application No. 60/126,167, filed on Mar. 25, 1999.

(51) Int. Cl.$^7$ .............................................. G06F 12/14
(52) U.S. Cl. ............................. 705/57; 705/52; 360/55; 713/17 C
(58) Field of Search ....................... 705/57, 52; 360/55; 713/176

(56) References Cited

U.S. PATENT DOCUMENTS

| | | | | |
|---|---|---|---|---|
| 4,977,594 A | * | 12/1990 | Shear ........................... | 705/52 |
| 5,247,575 A | * | 9/1993 | Sprague et al. ............. | 379/55.1 |
| 5,715,403 A | * | 2/1998 | Stefik .......................... | 705/44 |
| 5,887,060 A | * | 3/1999 | Ronning ...................... | 705/27 |
| 5,982,891 A | * | 11/1999 | Ginter et al. ................. | 705/26 |
| 6,049,789 A | * | 4/2000 | Frison et al. ................. | 705/30 |
| 6,236,971 B1 | * | 5/2001 | Stefik et al. .................... | 705/1 |

FOREIGN PATENT DOCUMENTS

| | | | | |
|---|---|---|---|---|
| FR | | 2811839 A | * 11/2000 | ........... G06F/19/00 |

OTHER PUBLICATIONS

IBM TDB NN9509345, Methods for thwarting corrupt implemenataion of data encryption, Sep. 1995.*

* cited by examiner

*Primary Examiner*—John W. Hayes
*Assistant Examiner*—John M Winter
(74) *Attorney, Agent, or Firm*—Edward W. Goodman

(57) ABSTRACT

A usage-limit is associated with each copy of copy-protected material. A conforming playback device determines how much usage has been made of the copy, and only plays the copy-protected material if the usage is within the associated usage-limit of the copy. In a preferred embodiment of this invention, the providing source of the copy contains a total-usage-measure that is allocated among each of the provided copies of the copy-protected material, thereby allowing for more than one copy of the copy-protected material to be produced, or "checked-out" from the providing source. When a copy of the copy-protected material is subsequently returned, or "checked-in" to the providing source, the usage allocation associated with this copy is returned to the total-usage-value. In this manner, if a particular copy of the copy-protected material is lost, damaged, or misplaced, the loss of value to the purchaser is merely a reduction in the available total-usage. In a preferred embodiment, the parameters associated with the usage-limit are communicated via the copy of the material in a secure manner, so that an illicit provider cannot alter these parameters. Similarly, in a preferred embodiment, the parameters associated with the usage-limit are securely bound to the copy-protected material, so that an illicit provider cannot substitute illicit material for the copied material. Other security measures, such as an encryption of the copy-protected material, watermarking, ticketing, and the like, are also compatible with these aforementioned techniques, and are included in a preferred embodiment of this invention.

10 Claims, 3 Drawing Sheets

USAGE DEPENDENT TICKET TO PROTECT COPY-PROTECTED MATERIAL

This application claims the benefit of U.S. Provisional Application No. 60/126,167 filed Mar. 25, 1999,

BACKGROUND OF THE INVENTION

1. Field of the Invention

This invention relates to the field of consumer devices, and in particular to techniques for preventing or discouraging the illicit duplication of copy protected material.

2. Description of Related Art

Techniques are continually being proposed and developed to prevent or discourage the illicit duplication of copy-protected material, such as commercial music recordings. These techniques generally attempt to limit the number of copies that can be made from a legitimate copy of the copy-protected material. At the same time, the purchaser of this legitimate copy expects to have unlimited rights for copying this material for his or her private purposes. For example, the typical purchaser has access to multiple means for playing and recording the material, and expects to be able to play the purchased material on each of these means, without constraints.

Increasingly common in the art is the use, of flash memory cards to record content material for playback on small portable devices. These flash memory cards, or similar electronic memory devices, have an advantage over conventional recording media such as discs or tapes, in that they contain no moving parts and are thus more reliable and robust. Similarly, the playback devices for these memory cards need not contain movement mechanisms and are therefore also more reliable, robust, and, in general, less expensive than conventional players. The electronic memory devices and corresponding players are also generally much smaller than conventional discs or tapes and corresponding players, and generally consume less power, further increasing their suitability for use as portable playback systems.

The availability of small, inexpensive media for copying copy-protected material presents a number of potential problems as the rights of the provider of the copy-protected material are balanced with the rights of the purchaser of the copy-protected material. Because the medium is small, and intended for highly portable applications, the likelihood of the medium being lost, damaged, or misplaced is high. As such, the purchaser will. Expect to be able to reproduce the content material as often as required to replace the lost, damaged, or misplaced copies. Contrarily, because the media is inexpensive, the likelihood of an illicit mass reproduction of the content material is high, and the provider of the material will expect to be able to prevent such an illicit mass reproduction.

One method for limiting the ability to copy the content material is a "check-out/check-in" system. In this, as in other protection schemes presented herein, it is assumed that the copying and playback devices are "conforming" devices, in that they conform to the standards used to protect copy-protected material. When a copy of the material is made from a providing device to a portable medium, the conforming providing device prevents additional copies from being made until the portable medium containing the copy is returned to the providing device. This scheme has a number of drawbacks: if the portable copy is lost, damaged, or misplaced, it cannot be "returned" to the providing device, and subsequent other copies cannot be made. Such a potential "one time copy" will not be acceptable to consumers at large. Conversely, multiple copies of the content material can be made directly from the portable copy, thereby obviating the protection benefits of this scheme. Similarly, although alternative schemes that allow for N simultaneous copies of the content material onto portable media may alleviate the consumer's concern for copy-limitations, these schemes are equally susceptible to mass reproductions directly from the portable medium.

BRIEF SUMMARY OF THE INVENTION

It is an object of this invention to provide a copy-protection method and system that balances the expected rights of the provider of copy-protected content material and the purchaser of this copy-protected content material. It is a further object of this invention to limit the loss of value incurred by a loss of the medium that contains copy-protected material. It is a further object of this invention to limit the economic feasibility of illicitly mass-producing copy-protected material.

These objects and others are achieved by associating a usage-limit with each copy of copy-protected material. A conforming playback device determines how much usage has been made of the copy, and only plays the copy-protected material if the usage is within the associated usage-limit of the copy. In a preferred embodiment of this invention, the providing source of the copy contains a total-usage-measure that is allocated among each of the provided copies of the copy-protected material, thereby allowing for more than one copy of the copy-protected material to be produced, or "checked-out" from the providing source. When a copy of the copy-protected material is subsequently returned, or "checked-in" to the providing source, the usage allocation associated with this copy is returned to the total-usage-value. In this manner, if a particular copy of the copy-protected material is lost, damaged, or misplaced, the loss of value to the purchaser is merely a reduction in the available total-usage. In a preferred embodiment, the parameters associated with the usage-limit are communicated via the copy of the material in a secure manner, so that an illicit provider cannot alter these parameters. Similarly, in a preferred, embodiment, the parameters associated with the usage-limit are securely-bound to the copy-protected material, so that an illicit provider cannot substitute illicit material for the copied material. Other security measures, such as an encryption of the copy-protected material, watermarking, ticketing, and the like, are also compatible with these aforementioned techniques, and are included in a preferred embodiment of this invention.

BRIEF DESCRIPTION OF THE DRAWINGS

The invention is explained in further detail, and by way of example, with reference to the accompanying drawings wherein.

Throughout the drawings, same reference numerals indicate similar or corresponding features or functions.

DETAILED DESCRIPTION OF THE INVENTION

Figure 1:
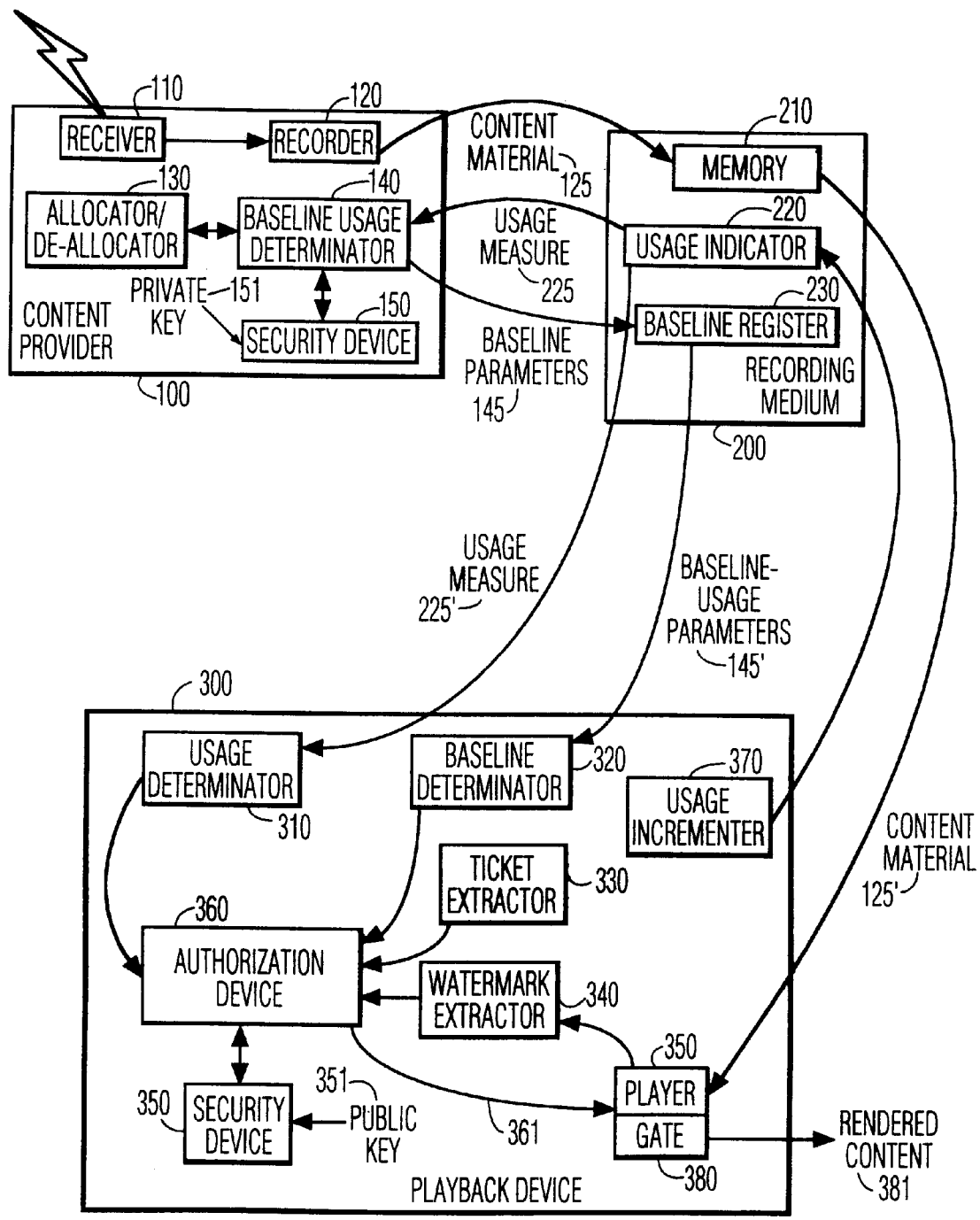
FIG. 1 illustrates an example block diagram of a usage-dependent ticketing system in accordance with this invention.

FIG. 1 illustrates an example block diagram of a usage-dependent ticketing system in accordance with this invention. The usage-dependent ticketing system includes a content provider 100, a recording medium 200, and a playback device 300. As used within the Secure Digital Music Initiative (SDMI), the content provider 100 is termed a "Licensed-SDMI Compliant Module" (LCM), the recording medium 200 is termed an "SDMI-Compliant Storage Medium" (CSM), and the playback device 300 is termed a "Portable Device" (PD), although the use of the principles presented herein are applicable beyond the SDMI standard.

The content provider 100 receives content material, typically from a remote site, such as an Internet site, via a receiver 110, although the content provider 100 could be a conventional CD, DVD, or other medium device player that is configured to provide copies of the contents of the medium to other recording medium 200 in a copy-limited fashion. That is, the receiver 110 represents any device that provides the content material 125 that is recorded to a memory 210 of the recording medium 200, via the recorder 120. Although this invention is well suited for a solid-state memory 210, other memory storage techniques, such as the use of magnetic or optical disks, tapes, rods, and the like may also be used.

To prevent mass reproductions of the content material 125, the content provider 100 allocates a portion of a limited total-usage measure to each copy of the content material 125 that is recorded to a recording medium 200. When the total-usage measure is completely allocated among recording media 200, the content provider 100 does not provide further recordings of the content material 125. When a recording medium 200 is returned to the content provider 100, the content provider 100 returns the portion of the total-usage measure that was allocated to the recording media 200 to the total-usage measure. That is, when each copy is "returned", the content provider de-allocates the portion that was allocated to this returned copy, thereby replenishing the total-usage measure for subsequent allocation. In this manner, the purchaser of the content material is only limited with regard to the number of co-temporal uses of copies of the protected content material.

In accordance with this invention, the recording media 200 is provided a set of "baseline-usage parameters" 145 that correspond to the allocated portion of the total-usage measure, and the conforming playback device 300 enforces this allocation by rendering the content material 125' from the recording medium 200 in conformance with this allocation. Any number of schemes may be employed to measure and monitor usage for conformance to the allocation. For example, the total-usage measure may be a total number of playbacks, or renderings, of the content material 125', such as fifty renderings, and the recording medium 200 may be allocated ten renderings. This allocation, ten, is stored on the recording medium 200 as a baseline-usage parameter 145 in a baseline register 230, and decremented by the playback device 300, or by the recording medium 200, each time the content material 125' is rendered by the playback device 300. When the baseline register 230 contains zero, further renderings are prevented, either by the playback device 300, or by the recording medium 200. Other usage measures include measuring the duration that the medium 200 is played by a playback device 300, measuring the number of times the medium 200 is inserted into, or removed from, a playback device 300, measuring an elapsed time since the content material was recorded onto the medium 200, and so on. The allocation, measure, and enforcement of such usage parameters will be evident to one of ordinary skill in the art in view of the principles presented in this disclosure.

When the "depleted" recording medium 200 is returned to the content provider 100, the total-usage measure is replenished by de-allocating the ten renderings that had been allocated to this recording medium 200. The recording medium 200 can then be reallocated a portion of the total-usage measure that is associated with the same content material 125 that it had previously received, or with new content material. Note that the total-usage measure is associated with each copy-protected content material, and can differ from, and be allocated differently from, other copy-protected content material. Because the playback device 300 or the recording medium 200 enforce the above described usage limitation, and because a conforming player 300 expects the recording medium 200 to contain this usage limitation, the illicit reproduction of the content material from the recording medium 200 will have little market value. That is, if the illicit copy includes the baseline register 230 that contains the baseline-usage parameters 145 that correspond to the allocated usage, the illicit copy will have a limited usage duration, alternatively, if it does not contain the baseline-usage parameters 145, it will not be usable on a conforming player 300. Thus, in accordance with the principles of this invention, by allocating a usage parameter to each copy of content material 125, the purchaser is provided a means for creating multiple copies of the content material 125, yet the harm caused by an illicit mass reproduction of the content material 125 is limited by an enforcement of the usage allocation. Correspondingly, a physical loss of the recording medium 200 has an acceptable effect on the purchaser, because only a portion of the. allocate-able total-usage measure will be lost.

The above description illustrates the principles of this invention, but as presented, does not preclude an illicit mass reproduction. A weak link in the above description is the possibility of falsifying the aforementioned baseline-usage parameters. In a preferred embodiment of this invention, the baseline-usage parameters 145 are stored on the recording medium 200 in a verifiable form, using a security device 150. Any number of secure techniques can be employed, using techniques common in the art. In a preferred embodiment, the baseline-usage parameters 145 are either encrypted or digitally signed, or both, using a private key 151 that is associated with a "trusted source" of copy-protected material. The playback device 300 of a preferred embodiment includes a corresponding security device 350 that authenticates the source of the baseline-usage parameters 145' that are read from the recording medium 200, using a public key 351 corresponding to the private key 151 of a public-private key pair that is assigned to the "trusted source". Alternatively, a two level structure may be employed whereby a first public key embedded in the playback device 300 is used to authenticate a second key from the content provider 100. In this manner, a public key from every possible content provider need not be provided in advance. That is, the public key of the playback is used to authenticate certificates from any content provider. Each content provider will apply to the manufacturer of all playback devices for such certificates. By authenticating the source of the baseline-usage parameters 145', substituting a counterfeit baseline-usage parameter 145 onto recording medium 200 that contains an illicit copy of the content material 125 will be ineffective. On the other hand, a "blind copy" of a recording medium 200 having an authorized usage allocation associated with the content material 125 will provide for a usable counterfeit, because the verifiable form of the baseline-usage parameters 145 will be copied as well. However, as noted above, these counterfeit copies will have minimal economic value, and thus not be a preferred target for an illicit mass reproduction, because the copied baseline-usage parameters 145 will place a limited life on the contents 125 of the memory 210 of the recording medium 200.

A preferred embodiment includes other measures to further protect the content material from illicit-mass production. An authorization device 360 in the playback device 300 coordinates these security measures and controls, or gates, the rendering 381 of the content material via agate 380 at the output of the player 350 in the playback device 300. If all of the security tests are passed, the authorization device 360 assert an authorization flag 361 that allows the content material 125' to become rendered content 381 by the player 350. Alternatively, some or all of these security measures may be enforced within the recording medium 200, although the expense of replicating such enforcement devices within each recording medium 200 would argue in favor of placing the authorization 360 and security 350 devices within each playback device 300, as illustrated.

As an additional security measure, the recording media 200 includes a usage indicator 220 that indicates the amount of usage that the recording media 200 has incurred. Preferably, the usage indicator 220 is a counter that can only be incremented, and never decremented or reset. This usage indicator will preferably contain a random value with respect to other recording media 200, so that its value cannot be predetermined. With each usage of the recording medium, the usage indicator 220 is incremented. A usage incrementer 370 is illustrated in the playback device 300, for ease of understanding, although the usage indicator 220 may be incremented by each access to-the memory 210 by a player 300, or by each insertion into a player 300, or any of a variety of explicit or implicit indications of a usage. For example, if the measure of usage is time, the recording medium 200 or the player 300 may contain a clocking system that increments the usage indicator 220 periodically. In a preferred embodiment, the content provider 100 reads the usage measure 225 from the usage indicator when the content material 125 is provided to recording medium 200. The content provider 100 uses this usage measure 225 to form thebaseline-usage parameters 145, thereby binding the baseline-usage parameters 145 to the particular recording medium 200. For example, the baseline-usage parameters 145 may contain this initial usage measure 225, and a final usage measure that is a sum of the initial usage measure 225 and the portion of total-usage that is allocated to this copy of the content material 125. The conforming playback device 300 reads (and verifies) the baseline-usage parameters 145' from the recording medium 200, via the baseline determinator 320, as well as the current value 225' of the usage indicator 220, via the usage determinator 310. In accordance with this aspect of the invention, the playback device 300 provides a rendering 361 of the content material 125' only if the current usage measure 225' is between the initial and final usage measures contained in the baseline-usage parameters 145'. By providing an increment-only usage indicator 220, illicit copies of the content material 125 cannot be produced on other recording media 200 by merely copying the baseline-usage parameters 145 from a recording medium 200 that contains a valid copy of the content material 125, because each recording medium 200 is likely to have, or can be designed to have, a statistically unique usage measure 225. That is, for example, the usage indicator can be a large counter, (e.g. 64 bits or more) that is initialized during manufacturing to a random number) and means can be provided to prevent this counter from being incremented at an excessively fast rate. A purchaser of "blank" recording medium 200 thus manufactured will not be able to use the same baseline-usage parameter 145 for each, because each medium 200 is likely to have a substantially different usage measure 225 than each other.

Other security techniques, common in the art, may also be applied. Illustrated in FIG. 1, the playback device 300 includes a ticket extractor 330 and watermark extractor 340. Generally, a watermark is a characteristic that is embedded within content. material such that a removal of the watermark cannot be effected without destroying or substantially degrading the content material. As presented in copending U.S. patent application, "Copy Protection by Ticket Encryption", Ser. No. 09/333,628, filed Jun. 15, 1999 for Michael A. Epstein, incorporated by reference herein, a ticket that controls access rights to the content material can be associated with the watermark, typically via a one-way hashing function. Rules are provided for determining the validity of the ticket, based on a comparison with a hashed, or multiply hashed, value of the watermark. If the content material 125' contains a watermark but does not contain a valid ticket, the authorization device 360 prohibits its rendering 361, regardless of the validity of the above described usage measures. In this manner, illicitly obtained content material 125 cannot be recorded onto recording media 200 that contain valid usage measures and parameters. To further prevent substitute content material 125 being illicitly recorded onto media 200 containing valid usage measures and parameters, a preferred embodiment of this invention binds the baseline-usage parameters 145 to the content material for which the portion of the total-usage measure was allocated. For example, the aforementioned ticket can be included in the baseline-usage parameters 145 that are encrypted or digitally signed before loading into the baseline-usage register 230 of the recording medium 200. An attempted counterfeit substitution of the ticket or the content material, or both, will result in a rejection by the authorization device 360 in conjunction with the security device 350. A substituted ticket will fail the aforementioned verification test based on the public key of the trusted provider, whether it matches the counterfeit content material or not, and a substituted counterfeit content material will not match a verified ticket that is associated with the original content material.

Figure 2:
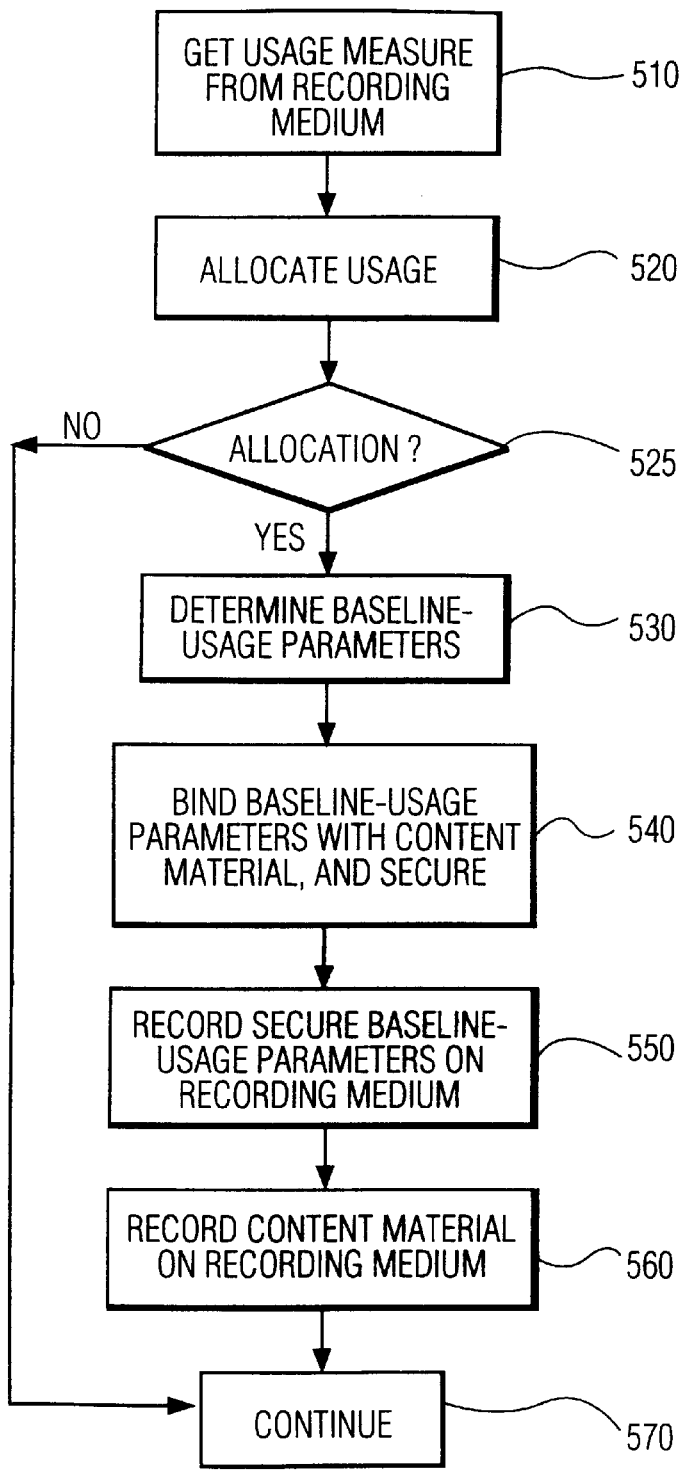
FIG. 2 illustrates an example flow diagram for recording usage-dependent content material in accordance with this invention.
Figure 3:
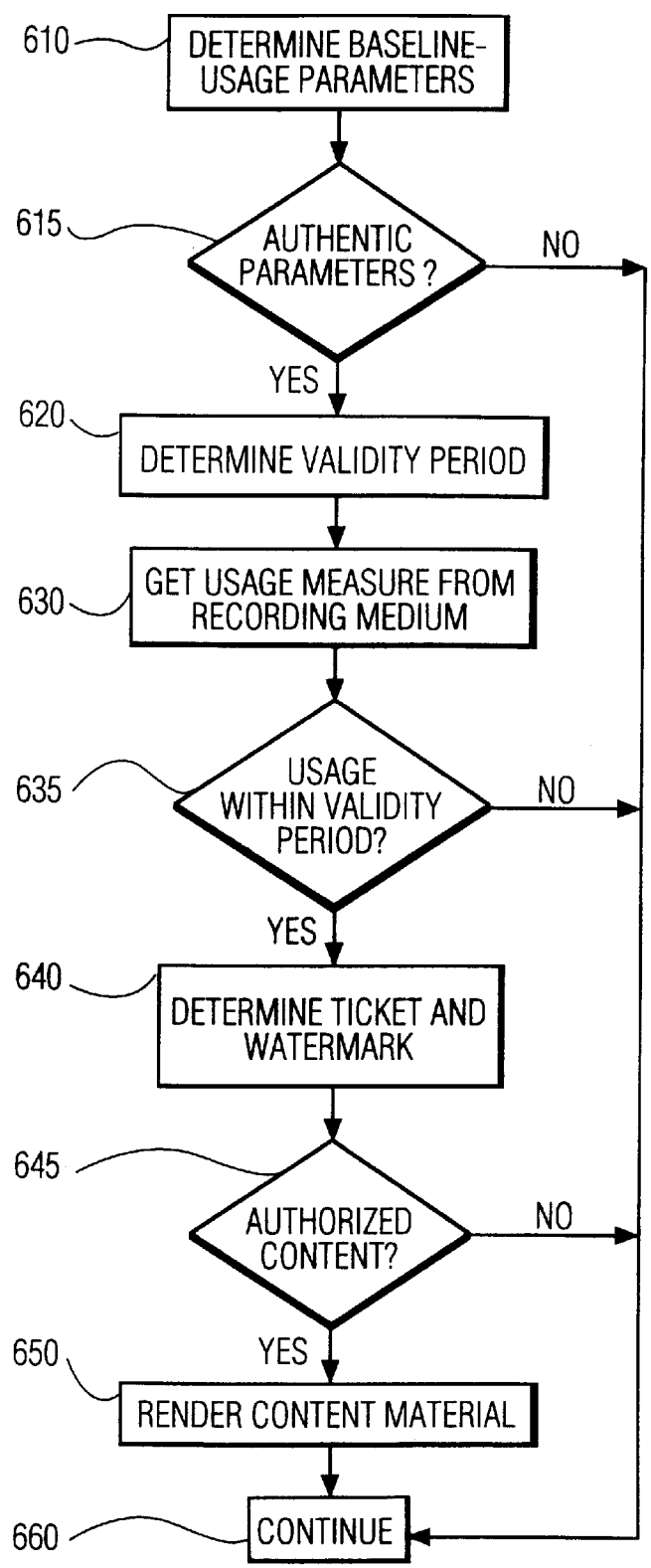
FIG. 3 illustrates an example flow diagram for rendering usage-dependent content material in accordance with this invention.

For completeness, FIG. 2 illustrates an example flow diagram for recording usage-dependent content material, and FIG. 3 illustrates an example flow diagram for rendering this recorded usage-dependent content material in accordance with a variety of aspects of this invention. As noted above, each of the discussed security techniques reduce the economic feasibility of an illicit mass-production of copy protected material, and a variety of techniques or combinations of techniques can be employed to achieve a desired level of security. The techniques and tests of FIGS. 2 and 3 are presented for illustration purposes.

At the start of the recording, or potential recording, the current usage measure associated with the recording medium is received, at 510. Not shown in the flow diagram, if this recording medium had received a prior usage allocation from the recording device, this allocation is returned to the total-usage measure associated with the previously recorded content material. At 520, a portion of the total-usage measure associated with the content material currently being provided is allocated to this recording medium. If, at 525, an allocation is not available, because a number of other copies of this content material have been made but not yet returned, the recording process 530–560 is bypassed. The baseline-usage parameters are determined, at 530, based on the current usage measure and the allocated usage. These parameters are bound to the content material, via, for example, the aforementioned ticket that is associated with the content material, or directly to the content material, and the values and the binding are secured, at 540. The security: may be an encryption of the parameters, a digital signing of the parameters, or both, and is preferably based on a private key of a public-private key pair that is associated with the provider of this content material. This secured set of parameters are recorded onto the recording medium, at 550. The public key of the public-private key pair is publicly known, and particularly known to the conforming players that are expected to read this secured information from the recording medium. At 560, the content material is recorded onto the recording medium. The process continues, at 570, wherein the recording device may issue a message confirming the completion of the recording process, or may issue a message reporting the lack of a sufficient usage allocation to provide the recording, and so on.

At the start of the playback, or rendering, process, the baseline-usage parameters are read from the recording medium, at 610 of FIG. 3. As a first test of authorization, the authenticity of the parameters is verified, at 615. As noted above, in a preferred embodiment, the parameters are encrypted or signed, or both, using a private key that is associated with a trusted provider of content material. The playback device verifies the authenticity of the parameters by, decrypting, them or by verifying the signature, or both, using the corresponding public key that is associated with the trusted provider. Other techniques for verifying the authenticity of secured items are common in the art. If the parameters are not verified as authentic, at 615, the remaining process 620–650 is bypassed. At 620, the valid period of usage is determined from the verified parameters, and at 630, the current measure of usage is read from the recording medium. If, at 635, the current measure of usage is not within the valid period of usage, the remaining process 640–650 is bypassed. At 640, the ticket and watermark associated with the content material are determined. As noted above, the ticket is preferably included in the parameters that are verified at 615. The watermark is typically determined by an extraction from the content material as it is read, using techniques common in the art. At 645, the ticket and watermark are compared to verify that the content material is authorized to be played; if not, the rendering process at 650 is bypassed. At 650 the content material is rendered. That is, if the content material is an audio recording, audio sounds corresponding to the recording are produced; if the content material is audio-visual, audio and visual reproductions corresponding to the recording are produced; and so on. Thereafter, the process continues, at 660, wherein, for example, a "not authorized"message is rendered in response to the failed tests at 615, 635, or 645.

The foregoing merely illustrates the principles of the invention. It will thus be appreciated that those skilled in the art will be able to devise various arrangements which, although not explicitly described or shown herein, embody the principles of the invention and are thus within its spirit and scope. For example, the portion of the usage-limit measure that is allocated to each recording medium 200 can be user-selectable, so that the user can allocate a large amount of usage to a medium 200 that is expected to be continually used, and a smaller amount to a medium 200 that is being taken to an environment in which the likelihood of loss or damage is high. Also, the allocation process and the enforcement of the allocation may be developed over time, based on consumer response to such restrictions. Consistent with an evolving process, the functional blocks of the content provider 100 and the playback device 300 can be configured to be able to receive new operating code or parameters via, for example, a download from an Internet site. In like manner, it is to be noted that the purpose of limiting the usage is to prevent a mass production of the content material. Consistent with this purpose, some of the above rules may be relaxed to further alleviate the burden placed on the purchaser of the original content material. After some relatively long time duration, for example, the usage-limit measure may be replenished, to accommodate for lost medium 200. That is, for example, the usage-limit measure may be replenished, at least partially, every month. In this manner, even a careless purchaser who frequently loses recording media can be assured a continuous, albeit limited, supply; contrarily, the monthly usage limit would preclude an effective mass production. These and other system configuration and optimization features will be evident to one of ordinary skill in the art in view of this disclosure, and are included within the scope of the following claims.

I claim:

1. A provider of content material comprising:
   a recorder for recording a copy of the content material on a recording medium;
   an allocator for allocating a portion of a total-usage measure to the copy of the content material; and
   a baseline-usage determinator for determining a measure of usage associated with the recording medium, for providing at least one baseline-usage parameter based on the measure of usage associated with the recording medium and the portion of the total-usage measure allocated to the copy of the content material, and for recording the at least one baseline-usage parameter on the recording medium,
   wherein the provider of content material further comprises:
   a security device for encoding the at least one baseline-usage parameter in a secure form, the security device binding the at least one baseline-usage parameter to a ticket that is a hashed value of a watermark that is associated with the content material.

2. The provider as claimed in claim 1, wherein:
   the security device is further configured to bind the at least one baseline-usage parameter to the content material.

3. The provider as claimed in claim 1, wherein:
   the allocator is configured to de-allocate the portion of the total-usage measure when the recording medium is subsequently processed by the provider of the content material.

4. The provider as claimed in claim 1, wherein:
   the allocator is configured to de-allocate the portion of the total-usage measure after a given time duration.

5. The provider as claimed in claim 1, wherein:
   the security device further encodes the at least one baseline-usage parameter in a secure form, the secure form including at least one of:
   a digital signature bound to the at least one baseline-usage parameter, and
   an encryption of the at least one baseline-usage parameter.

6. A method of providing content material, the method comprising the steps:

recording the content material on a recording medium;

allocating a portion of a total-usage measure to the content material on the recording medium;

determining a measure of usage associated with the recording medium; and recording at least one baseline-usage parameter on the recording medium based on the measure of usage associate with the recording medium and the portion of the total-usage measure, to facilitate a determination of a validity period associated with the content material on the recording medium, wherein said method further comprises the step:

binding the at least one baseline-usage parameter to a ticket that is a hashed value of a watermark that is associated with the content material.

7. The method as claimed in claim 6, wherein the method further comprises the step:

de-allocating the portion of the total-usage measure when the recording medium is subsequently processed.

8. The method as claimed in claim 6, wherein the method further comprises the step:

de-allocating the portion of the total-usage measure after a given time duration.

9. The method as claimed in claim 6, wherein the method further comprises the step:

binding the at least one baseline-usage parameter to the content material.

10. The method as claimed in claim 6, wherein the method further comprises the step:

encoding the at least one baseline-usage parameter in a secure form, the secure form including at least one of:

a digital signature bound to the at least one baseline-usage parameter, and an encryption of the at least one baseline-usage parameter.

* * * * *